(12) United States Patent
Mittal et al.

(10) Patent No.: US 11,367,345 B1
(45) Date of Patent: Jun. 21, 2022

(54) HYBRID LIGHT PERSONAL ELECTRIC VEHICLE ANALYSIS

(71) Applicant: Ford Global Technologies, LLC, Dearborn, MI (US)

(72) Inventors: Archak Mittal, Canton, MI (US); Andrea Broaddus, Berkeley, CA (US); James Fishelson, Ypsilanti, MI (US); Richard Twumasi-Boakye, Taylor, MI (US); Xiaolin Cai, Ann Arbor, MI (US); Dhanush Harihar, Novi, MI (US); Mohammed Fayaj navaz, Dearborn, MI (US); Amit Bhagwan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/145,756

(22) Filed: Jan. 11, 2021

(51) Int. Cl.
  *G08G 1/01* (2006.01)
(52) U.S. Cl.
  CPC ........... *G08G 1/0125* (2013.01); *G08G 1/012* (2013.01); *G08G 1/0145* (2013.01)
(58) Field of Classification Search
  CPC ...... B60Q 1/525; G08G 1/166; G08G 1/0129; G08G 1/0145; B60W 30/09; B60W 30/0956
  See application file for complete search history.

(56) References Cited

U.S. PATENT DOCUMENTS

| 10,074,280 | B2 | 9/2018 | Bai et al. | |
|---|---|---|---|---|
| 2002/0062207 | A1* | 5/2002 | Faghri | G08G 1/00 703/8 |
| 2016/0027299 | A1* | 1/2016 | Raamot | G08G 1/08 340/917 |
| 2018/0096605 | A1* | 4/2018 | Bai | G08G 1/161 |
| 2020/0283016 | A1* | 9/2020 | Blaiotta | B60W 60/0011 |
| 2021/0096571 | A1* | 4/2021 | Modalavalasa | G05D 1/0214 |

FOREIGN PATENT DOCUMENTS

WO   2019078866 A1   4/2019

OTHER PUBLICATIONS

Tang et al, "Behavior of Riders of Electric Bicycles at Onset of Green and Yellow at Signalized Intersections in China", Transportation Research Record: Journal of the Transportation Research Board, No. 2317, Transportation Research Board of the National Academies, Washington, D.C., DOI=10.3141/2317-11, Dec. 2012, 12 pages.

* cited by examiner

*Primary Examiner* — Mirza F Alam
(74) *Attorney, Agent, or Firm* — Brandon Hicks; Eversheds Sutherland (US) LLP

(57) ABSTRACT

Hybrid light personal electric vehicle analysis is disclosed herein. An example method includes determining empirical data from a light personal electric vehicle (LPEV) over a period of time, determining LPEV behaviors from the empirical data during the period of time, and building a hybrid simulation model over the period of time by switching between a pedestrian simulation model when the LPEV behaviors correspond to pedestrian behaviors and a vehicle simulation model when the LPEV behaviors correspond to vehicle behaviors.

20 Claims, 4 Drawing Sheets under the vehicle models are inadequate to represent their behavior in
HYBRID LIGHT PERSONAL ELECTRIC VEHICLE ANALYSIS

BACKGROUND

Light Personal Electric Vehicles (LPEV)s are part of an emerging mode of transportation called micromobility. These LPEVs can include small and lightweight vehicles that are easily foldable and portable, such as hoverboards, e-scooters, bicycles, e-bicycles, and the like. LPEVs can be carried onto public transit vehicles and inside buildings and may require human assistance in balancing and maneuvering. LPEVs can provide short trip service, as well as first-and-last mile connections to other transit options.

Transportation engineers seek to study the impact of micromobility on pedestrian and vehicle traffic flows by conducting simulations in a virtual environment. LPEV riders switch their behaviors between being a vehicle and a pedestrian, which complicates modeling.

Conventional traffic simulation software simulates ground surface vehicles, such as cars, trucks, and buses, through car-following models. Car-following models include underlying logic/rules of driver behaviors regarding maneuvering actions, such as acceleration/deceleration, lane-change, and so forth. To simulate pedestrians, the general approach is to utilize social field theories. Pedestrian-following models include the capability of making sudden directional changes, stops and the use of the entire available area (e.g., sidewalk) to move rather than following lanes. LPEV riders demonstrate behaviors of both pedestrians and vehicles.

Basic elements of traditional and conventional vehicle modeling include considering that users should follow lanes to maintain a safe distance from surrounding vehicles, ensuring that objects do not collide with or touch other elements in the system, and allowing changes in direction of travel in a gradual manner (e.g., no sharp turns). On the other hand, users of vehicles do not always obey all traffic rules, such as staying in their lane, and users may operate at unideal distances and spatial formations. When on roads. LPEV users may behave like slow vehicles, may use lanes that are restricted to cars (e.g. bicycle lanes), and users may or may not obey traffic rules, meaning that traditional vehicle models are inadequate to represent their behavior in a simulation environment.

Basic elements of traditional and conventional pedestrian modeling consider that pedestrians can move in the entire area, generally, they do not have a particular direction of travel on a facility, and that generally they make sudden stops, abruptly changing the direction of travel/walking (e.g., make a sudden change in direction). Additionally, contact between pedestrians or certain objects is acceptable or expected in some instances. When on sidewalks, trails, and other pedestrian infrastructure. LPEV users may behave like a fast-moving pedestrian (e.g. a jogger), but at a much higher speed, consistently going around or weaving through crowds of pedestrians, meaning that traditional pedestrian models are also inadequate.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to systems and methods for modeling LPEVs. For example, systems and methods are directed to hybrid modeling that considers both pedestrian behaviors and vehicle behaviors in combination, as well as the ability of users to switch back-and-forth between the two behaviors during use. These models allow LPEV simulation engineers to shape mobility services, as well as simulate LPEV trajectories, including interactions with other vehicles and pedestrians. For example, the LPEV modeling can be used to determine LPEV acceleration and trajectory within a sidewalk, a bike lane, and/or a vehicle lane (e.g., roadway). The LPEV models can be used to simulate hybrid behaviors of a user of an LPEV in a transportation system of a virtual simulation environment.

In this manner, the systems and methods disclosed herein are directed to a pedestrian-vehicle hybrid modeling approach to emulating the dual nature of LPEVs. The model simulates LPEV switching between pedestrian and vehicle infrastructure and realistically capturing their behaviors while using infrastructure and interacting with other vehicles, pedestrians, and LPEV users. This approach uses a hybrid of the vehicle and pedestrian models. It applies to all LPEVs but also some portion of riders using larger and faster vehicles, such as bicycles and e-bicycles, who may switch between vehicle and pedestrian behavior. The model also simulates LPEVs trajectories, including interactions with other vehicles and pedestrians (e.g., LPEV acceleration and trajectory within a bike lane). Accurate LPEV simulation allows engineers to shape mobility services, evaluate safety risks to LPEV users and those they interact with, forecast traffic volumes and speeds while accounting for the other elements of the system, and guide infrastructure investment plans by estimating the outcomes of potential infrastructure changes.

Illustrative Embodiments

Figure 1:
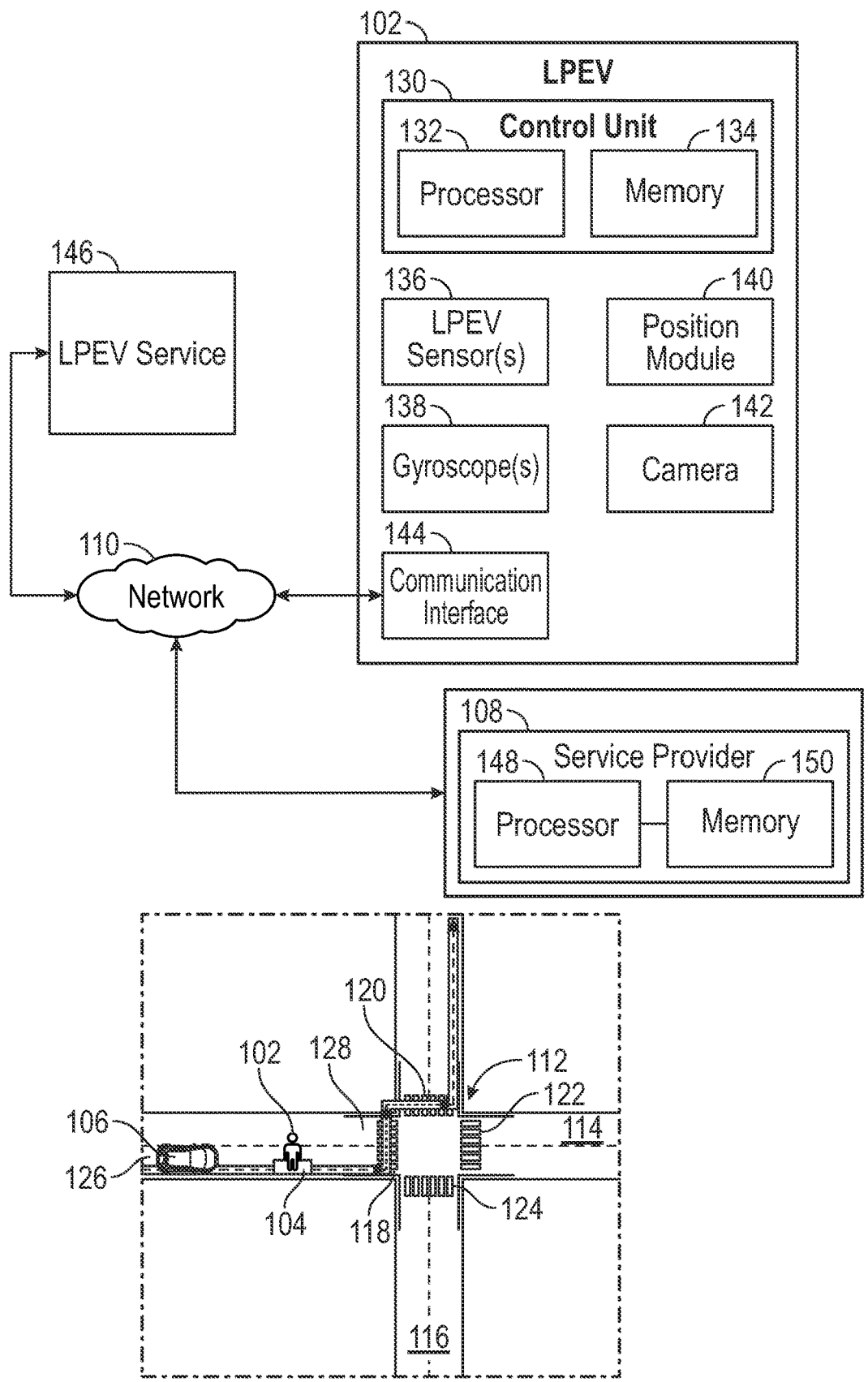
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can include a user 102, an LPEV 104, a vehicle 106, and a service provider 108. Broadly, the architecture 100 can include additional or fewer LPEVs and vehicles that those illustrated. In some examples, LPEVs and vehicles may be referred to as an agent or agents.

Generally, the LPEV 104, the vehicle 106, and the service provider 108 can communicate with one another over the network 110. The network 110 may include any one or a combination of multiple different types of networks, such as cable networks, the Internet, wireless networks, and other private and/or public networks. In some instances, the network 110 may include cellular, Wi-Fi, or Wi-Fi direct. It will be understood that neither the LPEV 104 nor the vehicle 106 need to be (but can be) adapted to connect to the network 110 to perform the methods disclosed herein.

The architecture 100 includes an intersection 112 comprise of two intersecting roads 114 and 116. Each side of the intersection 112 includes a crosswalk, such as crosswalks 118, 120, 122, and 124. The arrangement of the architecture 100 is provided for illustrative and descriptive purposes and is not intended to be limiting. In more detail, the road 114 and the road 116 are each two-lane roads. For example, road 114 includes a first vehicle lane 126 and a second vehicle lane 128. Further details regarding this configuration are disclosed in greater detail infra with respect to a first use case (Example Use Case One).

The service provider 108 can obtain data from the LPEV 104 and the vehicle 106 over the network 110. That is the LPEV 104 and the vehicle 106 is each connected objects that transmit data to the service provider 108. An LPEV model generated by the service provider 108 can be created and calibrated using empirical data such as gyroscopes. GPS traces, videography, sensors, counts data, and/or assumed scenarios—just to name a few. Individually and/or collectively, these empirical data can be used to determine an agent's behavior in the architecture 100. It will be understood that the data utilized herein does not need to be (but can be) collected in real-time. Models can be developed from data collected passively from sensors mounted to each type of vehicle. The model can be applied to forecast movements made by LPEVs with or without connectivity.

The LPEV 104 can comprise a control unit 130 that includes a processor 132 and memory 134. The memory 134 stores instructions that can be executed by the processor 132 to obtain empirical LPEV data from various sources. For example, the LPEV 104 can comprise one or more LPEV sensors 136, one or more gyroscopes 138, a position module 140, and a camera 142. These components collectively provide empirical data that can be assessed by the service provider to determine LPEV behaviors, such as whether the LPEV is behaving as a vehicle or a pedestrian. The LPEV sensor(s) 136 could include accelerometers, speed gauges, and the like. The position module 140 could collect GPS data.

The empirical data collected for the LPEV can be transmitted to the service provider 108 by a communications module 144 of the LPEV 104. In some instances, the empirical data can be obtained from an LPEV service 146, such as a backend service that collects and monitors LPEV data. For example, the LPEV service 146 could include a backend point-to-point service that monitors usage of an e-scooter fleet. By way of example, the LPEV service 146 could store LPEV usage data such as GPS traces. LPEV pickup and destination, LPEV speed, and the like.

As noted above. LPEVs may be operated as vehicles or carried/pushed by people when walking. Simulation of LPEV operational modes may involve a hybrid of vehicle and pedestrian models to simulate their behavior accurately in a virtual environment. Hybrid modeling approaches can switch the behavior between vehicle and pedestrian and the rules governing the behavior. These simulations can involve switching behaviors based on the need, regulations, behavior as observed in the field, interactions with other vehicles, or another object.

The service provider 108 can also include a processor 148 and memory 150. The memory 150 stores instructions that can be executed by the processor 148 to create and utilize hybrid simulation models in accordance with the present disclosure.

Figure 2:
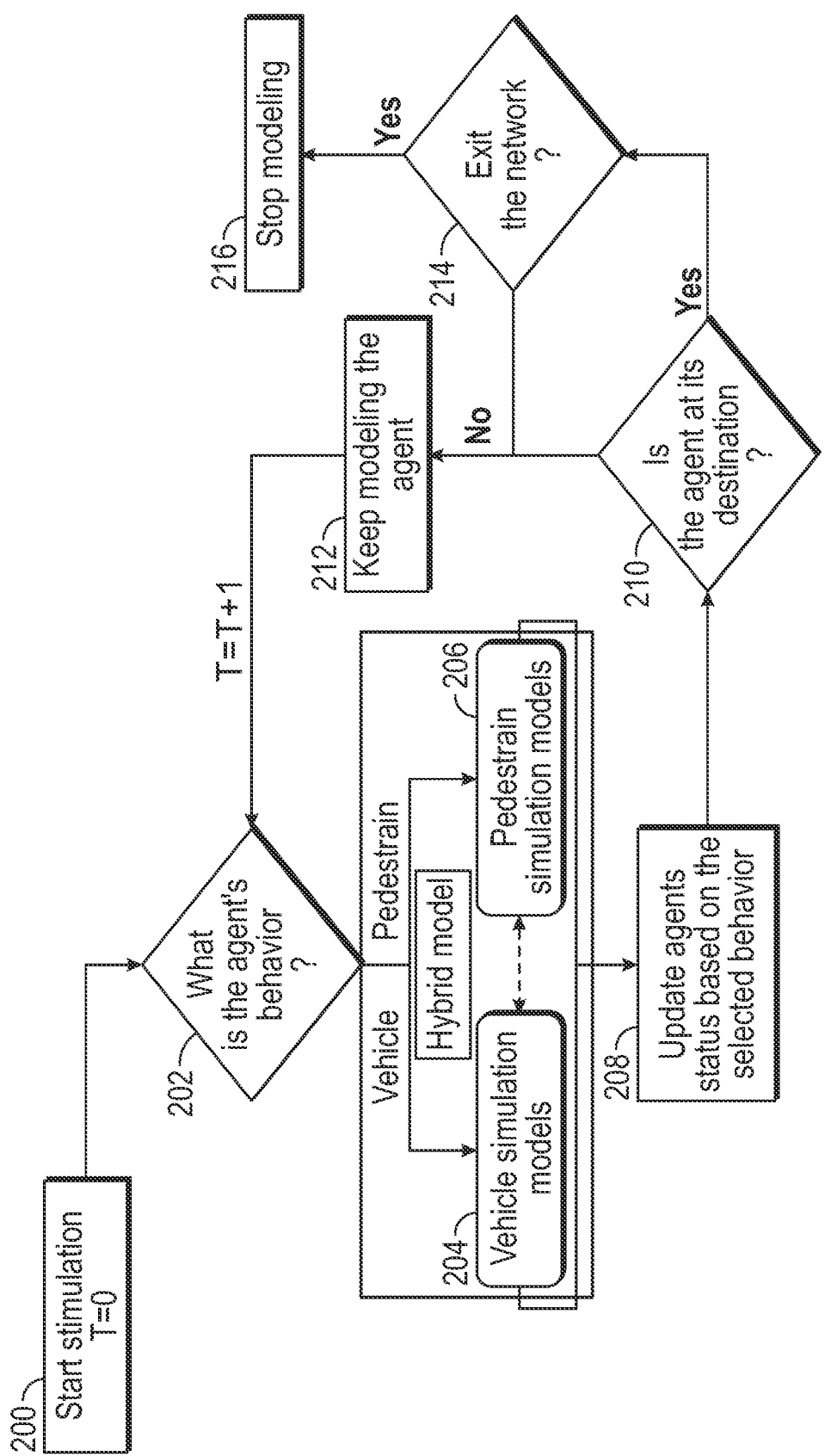
FIG. 2 is a flow diagram of an example process for creating a hybrid simulation model.

FIG. 2 illustrates an example flow diagram of a method for creating a hybrid LPEV model or simulation using the service provider 108. A simulation is initiated at step 200 at a first point in time where T=0. Behavior data (e.g., empirical data) are entered as input in step 202, where an agent's behaviors are determined. For example, with the LPEV 104, the direction, speed, acceleration, wheel RPM (revolutions per minute), orientation, and the like can be collected and transmitted to the service provider 108. These empirical data can be fed into a hybrid modeling engine that includes both vehicle modeling logic 204 and pedestrian modeling logic 206. Both the vehicle modeling logic 204 and pedestrian modeling logic 206 are utilized to generate a hybrid model 208. The service provider 108 can utilize a predefined rule set that can predict the behavior type of LPEV at each time-step-iteration and determine whether it should be modeled as a vehicle or a pedestrian.

With respect to vehicle modeling, the vehicle modeling logic 204 of the hybrid modeling engine of the service provider 108 can be configured to implement vehicle-based rules. Traffic simulation software can be used to simulate ground surface vehicles such as cars, trucks, buses through car-following models. Car-following models are underlying logics/rules of driver behaviors regarding maneuvering actions such as acceleration/deceleration, lane-change, and so forth. For example, it is assumed that vehicles follow lanes and maintain a safe distance from surrounding vehicles. That is, vehicles will maintain a safe gap between other vehicles. If there is an insufficient gap, it is assumed that the vehicle will decelerate. A leader vehicle may have rules that are defined by upcoming geometry from roads or other objects surrounding the vehicle. Lane change logic can also be implemented. Discretionary lane change rules can also be implemented that is based on various non-limiting parameters such as motivation, where there is a desire to make a lane change based on speed. Another parameter includes advantage, where the driver may desire to maneuver into a bitter position, and/or urgency, which represents an impatience factor that is attributed to the driver type. As is apparent, many of these parameters or metrics are inapplicable to pedestrian or LPEV behaviors. It is also assumed that vehicles do not collide with or touch other elements in the system (e.g., simulation) and that vehicles change the direction of travel in a gradual manner (i.e., no sharp turns).

To model LPEVs as vehicles, such as when LPEV is using vehicle infrastructure such as a bike lane or car lane, the vehicle modeling logic 204 predicts a trajectory of the LPEV within the vehicle travel lane. For example, the vehicle modeling logic 204 can be used to model or simulate the trajectory of a simulated LPEV. This trajectory can be determined using an adapted vehicle model to account for typical acceleration, deceleration, and weaving movements made by LPEV riders on the vehicle infrastructure. This part of the hybrid model 208 may be calibrated using empirical data such as gyroscopes, GPS traces, videography, sensors, traffic counts data, and/or assumed scenarios—just to name a few.

With respect to pedestrian modeling, the pedestrian modeling logic 206 of the hybrid modeling engine of the service provider 108 can be configured to implement pedestrian-based rules. Pedestrian behavior can be simulated using social field theories, for example. Pedestrian-following models have the capability of making sudden directional changes, stops and use the entire available area (i.e., sidewalk) to move rather than following lanes.

For example, it is assumed that pedestrians can move in the entire area, rather than be subjugated to operating in a particular lane of travel. Generally, pedestrians do not have a particular direction of travel. Pedestrians can make sudden stops, abruptly change the direction of travel/walking (i.e., make a sudden change in direction). Collision or touching other pedestrians or certain objects is acceptable. On the other hand, pedestrians (and therefore LPEVs) may function or behave as slow vehicles when on a road and may obey some traffic regulations.

When riders are parking, pushing, or carrying LPEVs, they are behaving as pedestrians using the pedestrian infrastructure. The pedestrian modeling logic 206 adapts a pedestrian model to predict the trajectory of the pedestrian within the sidewalk or crosswalk area, for example. This part of the hybrid model 208 can be calibrated using empirical data such as gyroscopes, GPS traces, videography, sensors, counts data, and/or assumed scenarios—just to name a few.

LPEV riders demonstrate the behaviors of both pedestrians and vehicles. Hence, LPEV modes, from a modeling perspective, can be envisioned as a vehicles-pedestrians hybrid with the riders switching their behavior dynamically. However, these two disparate models cannot be simply combined; an intelligent method of switching between them may be utilized to simulate LPEV rider behavior. The hybrid model 208 provides a vehicle-pedestrian hybrid modeling approach.

The output of the hybrid model 208 includes updates to the simulation where agents in the simulation are updated based on their selected behavior(s). This process continues in time until the agent reaches its destination. Thus, the method includes a step 210 where a determination is made as to if the agent has reached their destination. If the agent has not reached their destination, the modeling of the agent continues in step 212, which reverts back to step 202. If the agent has reached their destination, the agent is considered to have exited the network (e.g. environment) in step 214 and the modeling of that agent is terminated in step 216. Other agents can continue to be modeled and simulated as needed.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment." "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Example Use Case One

Referring back to FIG. 1, the LPEV 104 is operating in a bike lane of the first vehicle lane 126 of the road 114. The LPEV 104 is occupying the first vehicle lane 126 with other vehicles, such as the vehicle 106.

As the LPEV 104 approaches the intersection 112, the rider of the LPEV 104 stops, gets off the LPEV 104 and pushes or carries it to cross the street using the crosswalk 118 with other pedestrians.

After arriving at the other side of the intersection 112, the rider gets on the LPEV 104 and continues to ride it in a bike lane of the road 116. The rider can ride, push, or carry the LPEV 104 across another crosswalk 120 that spans the road 116. In this example, the LPEV rider first behaves as a vehicle, then switches to being a pedestrian, and finally resumes behaving like a vehicle. The pedestrian behavior(s) in this example can be modeled using social field models, for example. Other similar pedestrian modeling types can be used to model the LPEV 104 as a pedestrian. Where the LPEV 104 operates as a vehicle, the LPEV 104 can be modeled using the car-following and lane-changing models noted above. Other similar vehicle modeling types can be used to model the LPEV 104 as a vehicle.

Example Use Case Two

Figure 3:
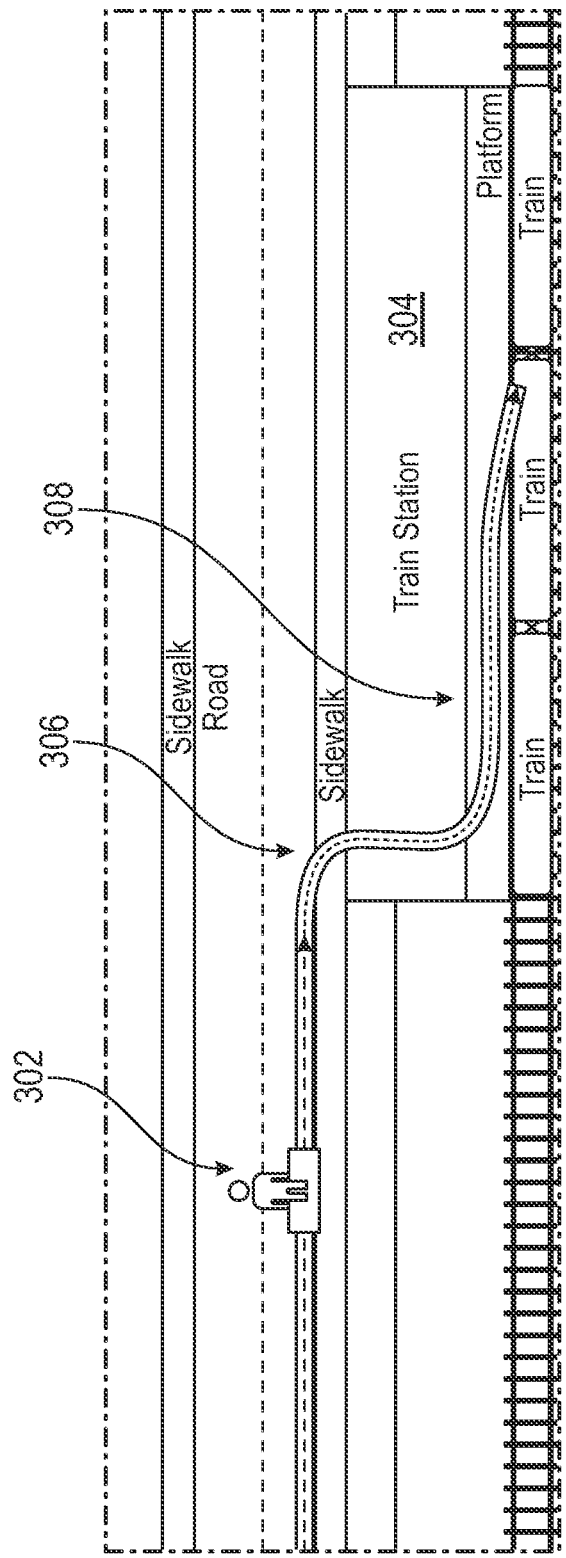
FIG. 3 illustrates an example of a public transportation use case for implementing aspects of the present disclosure.

The second use case involves assessing the use of public transit and refers generally to FIG. 3. In this example, an LPEV rider 302 is using either a bike lane or vehicle lane with other vehicles on the roadway, and then comes to a train station 304 and stops. The LPEV rider 302 may then park the LPEV if it was from a shared fleet. Alternatively, the LPEV rider 302 may push or carry the LPEV while walking crossing a sidewalk 306 to the train boarding platform 308 with other pedestrians and takes it aboard the train. In this example, the LPEV rider first behaves as a vehicle, then switches to being a pedestrian, and may or may not park the LPEV 302.

Figure 4:
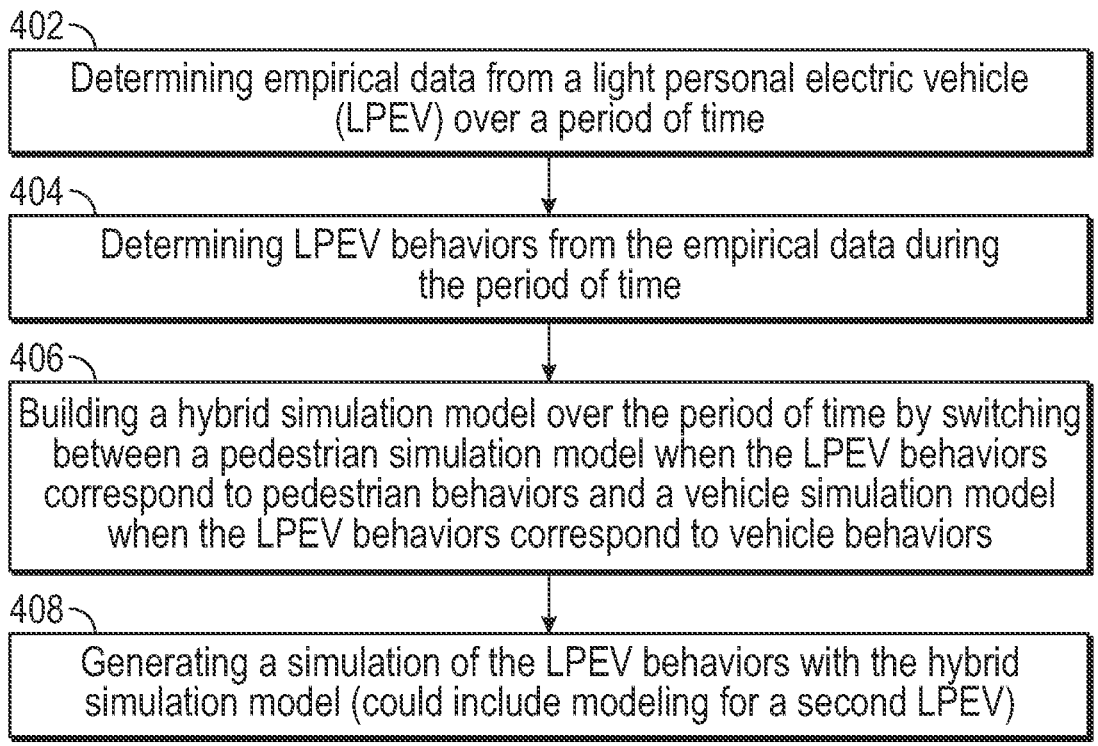
FIG. 4 is an example method of the present disclosure for providing an augmented reality experience.

FIG. 4 is a flowchart of an example method of the present disclosure. The method can include a step 402 of determining empirical data from a light personal electric vehicle (LPEV) over a period of time. As noted above, this can include collecting data directly from the LPEV over a network or from an LPEV backend service. In some instances, data can be obtained from other sources such as infrastructure cameras or nearby vehicles.

Once the empirical data are obtained, the method can include a step 404 of determining LPEV behaviors from the empirical data during the period of time. For example, the LPEV behaviors could include the LPEV being used as a vehicle for point-to-point transportation. Other examples can include the LPEV being used in a manner that is similar to how a pedestrian would act such as picking up and walking the LPEV, or operating the LPEV in a location such as a sidewalk that is not typically used by a vehicle.

The method can include a step 406 of building a hybrid simulation model over the period of time by switching between a pedestrian simulation model when the LPEV behaviors correspond to pedestrian behaviors and a vehicle simulation model when the LPEV behaviors correspond to vehicle behaviors. For example, when it is determined that the LPEV behavior is similar to a pedestrian, the pedestrian simulation model can be used. When it is determined that the LPEV behavior is similar to a vehicle, the vehicle simulation model can be used. These models can be switched between or toggled based on the LPEV behavior detected at a given point in time. Thus, as the LPEV behaviors change, the model used to simulate the LPEV behavior used may change. Thus, a hybrid model includes output from both the pedestrian simulation model and the vehicle simulation model as the LPEV behaviors change over the period of time.

The method can include a step 408 of generating a simulation of the LPEV behaviors with the hybrid simulation model. The simulation can be used by an engineer to design or improve infrastructure. For example, the simulation created using the hybrid simulation model could identify dangerous situations in the current infrastructure. A particular intersection may have a short traffic signal cycle for a crosswalk that is determined to be dangerous because LPEVs are driven across the crosswalk but are walked across other adjacent crosswalks. In some instances, the hybrid simulation model can be executed to predict behaviors of a second LPEV or a vehicle. For example, a prototype LPEV can be modeled using hybrid simulation models created using empirical data for other similar LPEVs. In one example, a prototype LPEV e-scooter could be modeled against hybrid simulation models created for other existing e-scooters.

Figure 5:
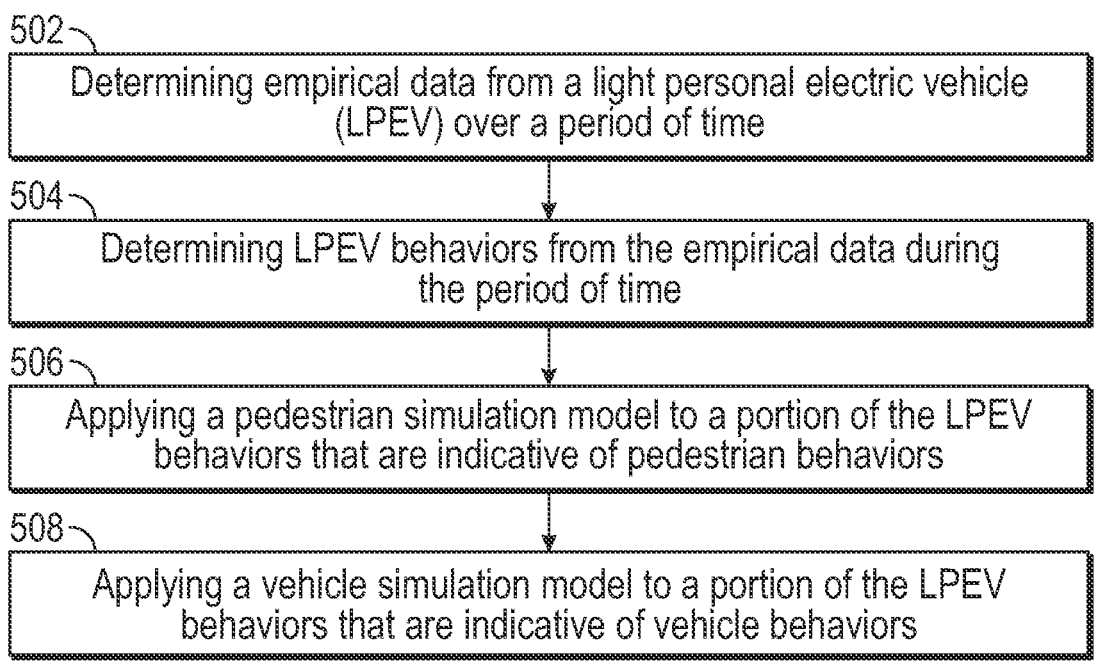
FIG. 5 is another example method of the present disclosure for providing an augmented reality experience.

FIG. 5 is a flowchart of another example method that includes a step 502 of determining empirical data from a light personal electric vehicle (LPEV) over a period of time. The method can also include a step 504 of determining LPEV behaviors from the empirical data during the period of time.

In some instances, the method can include a process of building a hybrid simulation model by executing a step 506 of applying a pedestrian simulation model to a portion of the LPEV behaviors that are indicative of pedestrian behaviors. Further, the method can include a step 508 of applying a vehicle simulation model to a portion of the LPEV behaviors that are indicative of vehicle behaviors. To be sure, the hybrid model includes output from both the pedestrian simulation model and the vehicle simulation model. The system used to create the hybrid model can toggle/switch/alternate between the underlying models used to create the hybrid model based on the LPEV behaviors over time.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM. ROM, EEPROM. CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones. PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining empirical data from a light personal electric vehicle (LPEV) over a period of time;
   determining LPEV behaviors from the empirical data during the period of time; and
   building a hybrid simulation model over the period of time by switching between a pedestrian simulation model when the LPEV behaviors correspond to pedestrian behaviors and a vehicle simulation model when the LPEV behaviors correspond to vehicle behaviors, wherein the pedestrian simulation model predicts a first trajectory of the LPEV when a rider of the LPEV is using the LPEV on pedestrian infrastructure and the vehicle simulation model predicts a second trajectory of the LPEV when the LPEV is using vehicle infrastructure.

2. The method according to claim 1, wherein the hybrid simulation model includes output from both the pedestrian simulation model and the vehicle simulation model as the LPEV behaviors dynamically change between the pedestrian behaviors and the vehicle behaviors over the period of time.

3. The method according to claim 1, wherein the empirical data for the LPEV includes data obtained from one or more of a gyroscope, GPS trace, videography, an LPEV sensor, counts data, and/or assumed scenarios.

4. The method according to claim 1, further comprising generating a simulation of the LPEV behaviors with the hybrid simulation model.

5. The method according to claim 1, further comprising updating the LPEV of the simulation as the empirical data and the LPEV behaviors change over the period of time to predict a trajectory for a simulated LPEV.

6. The method according to claim 1, further comprising determining that the LPEV has arrived at a destination.

7. The method according to claim 6, further comprising terminating the hybrid simulation model when the LPEV has exited a network of the simulation by reaching a destination.

8. The method according to claim 1, wherein the pedestrian simulation model comprises pedestrian behavior simulated using social field theories and the vehicle simulation model comprises traffic simulation.

9. A method, comprising:
   determining empirical data from a light personal electric vehicle (LPEV) over a period of time;
   determining LPEV behaviors from the empirical data during the period of time; and
   building a hybrid simulation model by:
      applying a pedestrian simulation model to a portion of the LPEV behaviors that are indicative of pedestrian behaviors; and
      applying a vehicle simulation model to a portion of the LPEV behaviors that are indicative of vehicle behaviors, wherein the hybrid model includes output from both the pedestrian simulation model and the vehicle simulation model,
      wherein the pedestrian simulation model predicts a first trajectory of the LPEV when a rider of the LPEV is using the LPEV on pedestrian infrastructure and the vehicle simulation model predicts a second trajectory of the LPEV when the LPEV is using vehicle infrastructure.

10. The method according to claim 9, wherein the hybrid simulation model includes output from both the pedestrian simulation model and the vehicle simulation model as the LPEV behaviors dynamically change between the pedestrian behaviors and the vehicle behaviors over the period of time.

11. The method according to claim 9, wherein the empirical data for the LPEV includes data obtained from any of one or more of a gyroscope, GPS trace, videography, an LPEV sensor, counts data, and/or assumed scenarios.

12. The method according to claim 9, further comprising determining that the LPEV has arrived at a destination and terminating the hybrid simulation model when the LPEV has exited a network of the simulation by reaching a destination.

13. The method according to claim 9, wherein the pedestrian simulation model comprises pedestrian behavior simulated using a social field theory and the vehicle simulation model comprises traffic simulation.

14. A system, comprising:
   a processor and memory for storing instructions, the processor executing the instructions to:
      receive empirical data of a light personal electric vehicle (LPEV) over a period of time;
      determine LPEV behaviors from the empirical data during the period of time;
      build a hybrid simulation model over the period of time by switching between a pedestrian simulation model when the LPEV behaviors correspond to pedestrian behaviors and a vehicle simulation model when the LPEV behaviors correspond to vehicle behaviors, wherein the pedestrian simulation model predicts a first trajectory of the LPEV when a rider of the LPEV is using the LPEV on pedestrian infrastructure and the vehicle simulation model predicts a second trajectory of the LPEV when the LPEV is using vehicle infrastructure; and execute the hybrid simulation model to predict behaviors of a second LPEV.

15. The system according to claim 14, wherein the hybrid model includes output from both the pedestrian simulation model and the vehicle simulation model as the LPEV behaviors dynamically change between the pedestrian behaviors and the vehicle behaviors over the period of time, and wherein the empirical data for the LPEV include data obtained from any of one or more of a gyroscope, GPS trace, videography, an LPEV sensor, counts data, and/or assumed scenarios.

16. The system according to claim 14, wherein the processor is configured to update the LPEV of the simulation as the empirical data and the LPEV behaviors change over the period of time.

17. The system according to claim 14, wherein the processor is configured to determine that the LPEV has arrived at a destination.

18. The system according to claim 17, wherein the processor is configured to terminate the hybrid simulation model when the LPEV has exited a network of the simulation by reaching a destination.

19. The system according to claim 14, wherein the pedestrian simulation model comprises pedestrian behavior simulated using social field theories and the vehicle simulation model comprises traffic simulation.

20. The system according to claim 14, wherein the empirical data are received from either the LPEV or a backend LPEV service over a network.

* * * * *